(12) United States Patent
Farrington et al.

(10) Patent No.: US 9,417,396 B2
(45) Date of Patent: Aug. 16, 2016

(54) OPTOELECTRONIC SWITCH

(71) Applicant: Rockley Photonics Limited, Marlborough Wiltshire (GB)

(72) Inventors: Nathan Farrington, Arcadia, CA (US); Andrew Rickman, Marlborough (GB)

(73) Assignee: Rockley Photonics Limited, Marlborough Wiltshire (GB)

( * ) Notice: Subject to any disclaimer, the term of this patent is extended or adjusted under 35 U.S.C. 154(b) by 0 days.

(21) Appl. No.: 14/639,041

(22) Filed: Mar. 4, 2015

(65) Prior Publication Data

US 2016/0091666 A1    Mar. 31, 2016

Related U.S. Application Data

(60) Provisional application No. 62/057,818, filed on Sep. 30, 2014.

(51) Int. Cl.

| G02B 6/35 | (2006.01) |
|---|---|
| G02B 6/12 | (2006.01) |
| H04Q 11/00 | (2006.01) |
| H04J 14/02 | (2006.01) |
| G02B 6/42 | (2006.01) |

(52) U.S. Cl.
CPC ............ *G02B 6/356* (2013.01); *G02B 6/12021* (2013.01); *G02B 6/3546* (2013.01); *H04J 14/0284* (2013.01); *H04Q 11/0005* (2013.01); *G02B 6/3596* (2013.01); *G02B 6/4246* (2013.01); *H04Q 2011/006* (2013.01)

(58) Field of Classification Search
None
See application file for complete search history.

(56) References Cited

U.S. PATENT DOCUMENTS

| 6,768,827 B2 | 7/2004 | Yoo |
|---|---|---|
| 8,676,004 B1 | 3/2014 | Urata et al. |

(Continued)

FOREIGN PATENT DOCUMENTS

| CN | 103795654 A | 5/2014 |
|---|---|---|
| WO | WO 2011/076442 A1 | 6/2011 |

OTHER PUBLICATIONS

Farrington, Nathan et al.; "A 10 μs Hybrid Optical-Circuit/Electrical-Packet Network for Datacenters"; Optical Society of America; 2013; 3pp.

(Continued)

*Primary Examiner* — Jerry Rahll
(74) *Attorney, Agent, or Firm* — Lewis Roca Rothgerber Christie, LLP

(57) ABSTRACT

An optoelectronic switch comprising: N switch modules, where N is an integer; and an optical full-mesh interconnect; each switch module comprising: M client facing input ports, and M output facing ports, M being an integer which is either equal to or not equal to N; a pre-mesh AWG, the pre-mesh AWG having M inputs and N outputs, each of the N outputs connected to a respective input on the optical full-mesh interconnect; a post-mesh AWG, the post-mesh AWG having N inputs and M outputs, each of the N inputs connected to a respective output of the optical full-mesh interconnect and each of the M outputs for communicating a signal to one or more of the M outputs of the switch module; and a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG.

20 Claims, 3 Drawing Sheets

(56) References Cited

U.S. PATENT DOCUMENTS

| 8,792,787 | B1 | 7/2014 | Zhao et al. |
| 2003/0133641 | A1 | 7/2003 | Yoo |
| 2007/0092248 | A1 | 4/2007 | Jennen |
| 2009/0034978 | A1 | 2/2009 | Gazzola et al. |
| 2015/0277157 | A1 | 10/2015 | Jones et al. |

OTHER PUBLICATIONS

Gripp, Jürgen et al.; "Optical Switch Fabrics for Ultra-High-Capacity IP Routers"; Journal of Lightwave Technology; vol. 21; No. 11; Nov. 2003; pp. 2839-2850.

Gripp, Jürgen et al.; "Architectures, Components, and Subsystems for Future Optical Packet Switches"; IEEE Journal of Selected Topics in Quantum Electronics; vol. 16; No. 5; Sep./Oct. 2010; pp. 1394-1404.

Lucerna, Diego et al.; "AWG-based architecture for optical interconnection in asynchronous systems"; IEEE 12th International Conference on High Performance Switching and Routing; 2011; 6pp.

Ngo, Hung Q. et al.; "Nonblocking WDM Switches Based on Arrayed Waveguide Grating and Limited Wavelength Conversion"; Proceedings 23rd Conference of IEEE Communications Soc.; 2004; 11 pp.

Pallavi, S. et al.; "AWG Based Optical Packet Switch Architecture"; I.J. Information Technology and Computer Science; 2013; 04; pp. 30-39.

Ye, Tong et al.; "AWG-based Non-blocking Clos Networks"; IEEE/ACM Transactions on Networking; Feb. 2014; 13pp.

International Search Report and Written Opinion for related International Application No. PCT/EP2015/072565, mailed Jan. 21, 2016, 13pp.

European Search Report for related Application No. GB1506729.1, mailed May 19, 2015, 3pp.

OPTOELECTRONIC SWITCH

FIELD OF THE INVENTION

The present invention relates to an optoelectronic switch, particularly to an optoelectronic switch comprising a plurality of switch modules and an optical full-mesh interconnect, each switch module comprising a plurality of array waveguide gratings (AWGs) and at least one array of Detector Remodulators DRMs.

BACKGROUND OF THE INVENTION

It is known that switching systems can be constructed from a combination of AWGs and tunable wavelength convertors (TWCs) and the potential for the cyclic AWG in optical switching has been recognized in recent years. Ye et al (IEEE/ACM Transactions on Networking, VOL PP, Issue 99, Page 1, February 2014) describe the use of AWGs in Clos-type optical switches and other architectures and Ngo et al (Proceedings 23rd Conference of IEEE Communications Soc, 2004) have illustrated AWG switch architectures that are rearrangeably non-blocking and strictly non-blocking. Lucerna et al (AWG-Based architecture for optical interconnection in asynchronous systems in 2011 IEEE 12th International Conf on High Performance Switching and Routing) have discussed the problem of cross-talk in high port count AWGs and proposed a method of overcoming this by scheduling packets. In all such systems there must be an efficient means of optical wavelength conversion and the wavelength must be tunable. Pallavi and Lakshmi (I. J. Information Technology and Computer Science, 2013, 04, 30-39) have discussed optical packet switches constructed with AWGs where there is central control over the whole packet switch. U.S. Pat. No. 8,792,787 describes optical packet switches involving TWCs and AWGs combined in layers and in 2 or more stages.

SUMMARY OF THE INVENTION

The present invention provides, according to a first aspect, an optoelectronic switch comprising: N switch modules, where N is an integer; and an optical full-mesh interconnect; each switch module comprising: M client facing input ports, and M output facing ports, M being an integer which is either equal to or not equal to N; a pre-mesh Arrayed Waveguide Grating (AWG), the pre-mesh AWG having M inputs and N outputs, each of the N outputs connected to a respective input on the optical full-mesh interconnect; a post-mesh AWG, the post-mesh AWG having N inputs and M outputs, each of the N inputs connected to a respective output of the optical full-mesh interconnect and each of the M outputs for communicating a signal to one or more of the M outputs of the switch module; and a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG.

In this way, the pre-mesh and post-mesh AWGs are used both for wavelength division multiplexing/demultiplexing as well as wavelength routing.

Preferably, all of the AWGs are cyclic AWGs. It is envisaged that one or more of the AWGs of any of the embodiments described herein could be replaced by alternative wavelength dependent optical components such as an Echelle grating.

For the purpose of this invention a DRM should be understood to be an example of a type of tunable wavelength converter (TWC). It is envisaged that one or more of the DRMs of any of the embodiments described herein could be replaced by alternative TWCs.

In more detail, a Detector Remodulator is a device used to convert a first optical signal to a second optical signal. For the purpose of the present invention, the first optical signal will have a first wavelength and the second optical signal may have a second wavelength different to the first wavelength so that each of the DRMs function as a wavelength converter.

The DRM includes a photodetection stage (e.g. a photodiode) where the first optical signal (modulated) is detected and converted into an electrical signal. The photodetection stage is followed by a modulation stage (i.e. a modulator) configured to receive the electrical signal from the photodetection stage and also to receive an unmodulated light input having a tunable wavelength. The unmodulated light input is modulated by the modulated electrical signal produced at the photodetection stage. The modulated optical signal that is created at the modulation stage will therefore have a wavelength that corresponds to that of the unmodulated light signal. Whilst in the electrical domain, the signal may advantageously be processed, for example by one or more of: amplification, reshaping, re-timing, and filtering before being applied to the second wavelength/channel. Each DRM may therefore include a CMOS chip for carrying out one or more of these functions, the CMOS chip connecting the photodetector of the DRM to the modulator of the DRM.

In our GB 1403191.8, the complete disclosure of which is herein incorporated by reference, we describe a number of examples of Detector Remodulators (DRMs) that could form one or more of the DRMs of the present invention.

One example of a Detector Remodulator may comprise a silicon on insulator (SOI) waveguide platform including: a detector coupled to a first input waveguide (for receiving the first optical signal); a modulator coupled to a second input waveguide (for receiving the tunable wavelength input) and an output waveguide; and an electrical circuit connecting the detector to the modulator; wherein the detector, modulator, second input waveguide and output waveguide may be arranged within the same horizontal plane as one another; and wherein the modulator includes a modulation waveguide region at which a semiconductor junction is set horizontally across the waveguide. The modulation region may be a phase modulation region or an amplitude modulation region. However, it should be understood that any suitable DRM configured to act as a wavelength converter could be used. Tunable lasers are usually continuously tunable over a given range of wavelengths. However, also included in the definition of a tunable laser is one that may not be tunable across the whole of a wavelength band but where pre-set wavelengths may be selected across that wavelength band.

When constructing AWG-based switches using traditional TWCs, the number of switch stages, and the maximum size of the switch, are limited by the amount of insertion loss of the AWGs. Using DRMs instead of traditional TWCs removes the problem of insertion loss by regenerating the signal when needed to allow for larger switches. DRMs can use different techniques for performing regeneration, such as optical-electrical-optical (OEO) conversion. A DRM can be used to implement a circuit switch. A DRM with OEO functionality can also contain electronic buffers and can be used to buffer data to implement a burst switch, packet switch, or cell switch.

The development of the Detector Remodulator (DRM) as described herein enables packet switching in a flexible and scalable manner. DRMs may be made with varying functionality and thus enable a variety of optical switch architectures which were hitherto impracticable.

In this invention, we thereby disclose how to construct an incrementally deployable scalable switching system by using a novel combination of DRMs and AWGs.

The signal from each input of the switch module may be provided to the first array of DRMs directly or indirectly. When applied indirectly, a signal from an input of the switch module may reach an input of one of DRMs or the first array of DRMs via other components as explained in more detail below.

The close photonic/electronic integration of the present invention reduces power consumption. Switching in optical domain bypasses electronics speed and size bottleneck. Furthermore, the innovative network architecture increases scalability and reduces hardware required.

A full mesh interconnect (also referred to as a fully connected network) is a network topology in which there is a direct link between all possible pairs of nodes. For example, in a full mesh interconnect having n nodes, there are $n(n-1)/2$ direct links. Such interconnects advantageously provide a high degree of reliability because a large number of redundant links exist between nodes. The optoelectronic switch may have any one of or, to the extent that they are compatible, any combination of the following optional features.

The optoelectronic switch may further comprise a second array of Detector Remodulators (DRMs) located after the post-mesh AWG, each DRM of the second array configured to regenerate and/or convert the wavelength of a signal from a respective output port of the post-mesh AWG for communication to an output port of the switch module.

This communication to an output port of the switch module may be a direct connection or may be an indirect communication involving extra components which may act on the signal, for example to change its wavelength and ultimately the final output port.

The optoelectronic switch may further comprise a rearrangement AWG located after the second array of DRMs, the rearrangement AWG having M input ports and M output ports, each of the M input ports connected to an output of a respective DRM of the second array of DRMs; and each output port of the rearrangement AWG connected to an output of the switch module.

The presence of a rearrangement AWG after the post-mesh AWG means that communication of a signal from the post-mesh AWG to the output ports of the switch module includes an extra rearrangement step. In this way, overall bandwidth of the switch can be increased.

The optoelectronic switch may further comprise a final array of DRMs after the rearrangement AWG such that the connection between each of the output ports of the rearrangement AWG and an output port of the switch module is achieved via one of the DRMs of the final array.

In this way, the final array of DRMs provides a mechanism for choosing the actual output port of the switch module irrespective of the path that a signal takes through the rearrangement AWG.

The optoelectronic switch may further comprise a rearrangement AWG located before the first array of DRMs, the rearrangement AWG having M input ports and M output ports, each of the M input ports connected to an output of a respective DRM of the second array of DRMs; and each output port of the rearrangement AWG connected to an output of the switch module.

The presence of a rearrangement AWG after the post-mesh AWG means that communication of a signal from an input port of the switch module to a respective input port of the pre-mesh AWG includes an extra rearrangement step. In this way, overall bandwidth of the switch can be increased.

The optoelectronic switch may further comprise an array of rearrangement Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the rearrangement AWG.

Each array of DRMs may take the form of one or more optical chips and one or more electronic components (for example CMOS chips). Preferably an array of DRMs consists of a plurality of photodectectors, a plurality of tunable laser inputs, a plurality of optical modulators and a single CMOS chip. More preferably the array of DRMs is fabricated on a single optical chip intimately connected to a single CMOS chip. Even more preferably the optical chip is a silicon chip.

Optionally, $N \neq M$.
Optionally, $N > M$.
Optionally, $N < M$.
Optionally, $N = M$.
Optionally, the optical full-mesh interconnect is an optical backplane.

Optionally, the optoelectronic switch may be configured to act as a circuit switch. Circuit-switch connections require dedicated point-to-point connections during data transfer. This simplifies the design of the DRM as less functionality is required.

Optionally, the optoelectronic switch may be configured to act as a packet switch. A packet switch embodiment will differ from a circuit switch embodiment in that the DRMs of the switch module contain additional circuitry. In particular, a packet processor is required to determine which output port each packet should be sent to, based on the contents of each packet. A scheduler would also be present to control the overall timing of each packet through the switch by way of control of the tunable laser inputs for each DRM.

Optionally, the optoelectronic switch may be configured to act as a cell switch. In this way, the DRMs are configured in a similar way to that of the packet switch but uses fixed length cells. Scheduling the transfer of packets therefore requires the extra step of segmenting the data into fixed length cells (segments).

Optionally, the optoelectronic switch may be configured to act as a burst switch. In this way, the DRMs are configured to send multiple packets from the same source to the same destination consecutively.

Optionally, the optical full-mesh interconnect may have a "folded configuration" which forms a fold in the optoelectronic switch module, wherein for each optoelectronic switch module: the pre-mesh AWG is located before the fold; and the post-mesh AWG located after the fold.

The "folded configuration" of the optical full-mesh may be understood to mean that the inputs of the mesh are located on the same side of the mesh as the outputs of the mesh.

A switch module for connection to such a mesh will also have a "folded configuration" which results in the inputs of the switch module being located on the same side of the switch module as the outputs of the switch module.

For the purpose of the present invention, the "folded configuration" means that on a switch module, a single component of the switch module may be built to incorporate both pre-mesh and post-mesh components. In this way, the single component will be configured to process not only pre-mesh signals (i.e. those signals transmitted to the mesh), but also post-mesh signals (i.e. those signals received from the mesh).

Optionally, the input and output ports of each optoelectronic switch module are all arranged on a single external panel.

Preferably, the optoelectronic switch is constructed from silicon photonics. The combination of a silicon photonics platform and the structure of the architecture enables easy scaling to higher radix. Furthermore, the silicon photonics platform is highly manufacturable at low cost.

According to a second aspect of the present invention, there is provided, an optoelectronic switch module for use with an optical full-mesh interconnect, the optoelectronic switch module comprising: M client facing input ports, and M output facing ports, where M is an integer; a pre-mesh AWG, the pre-mesh AWG having M inputs and N outputs where N is an integer which is either equal to or not equal to M, each of the N outputs connected to a respective input on the optical full-mesh interconnect; a post-mesh AWG, the post-mesh AWG having N inputs and M outputs, each of the N inputs connected to a respective output of the optical full-mesh interconnect and each of the M outputs for communicating a signal to one or more of the M outputs of the switch module; and a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG.

It is understood that each of the optional features described above in relation to the optoelectronic switch of the first aspect are equally applicable to the optoelectronic switch module of the second aspect.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
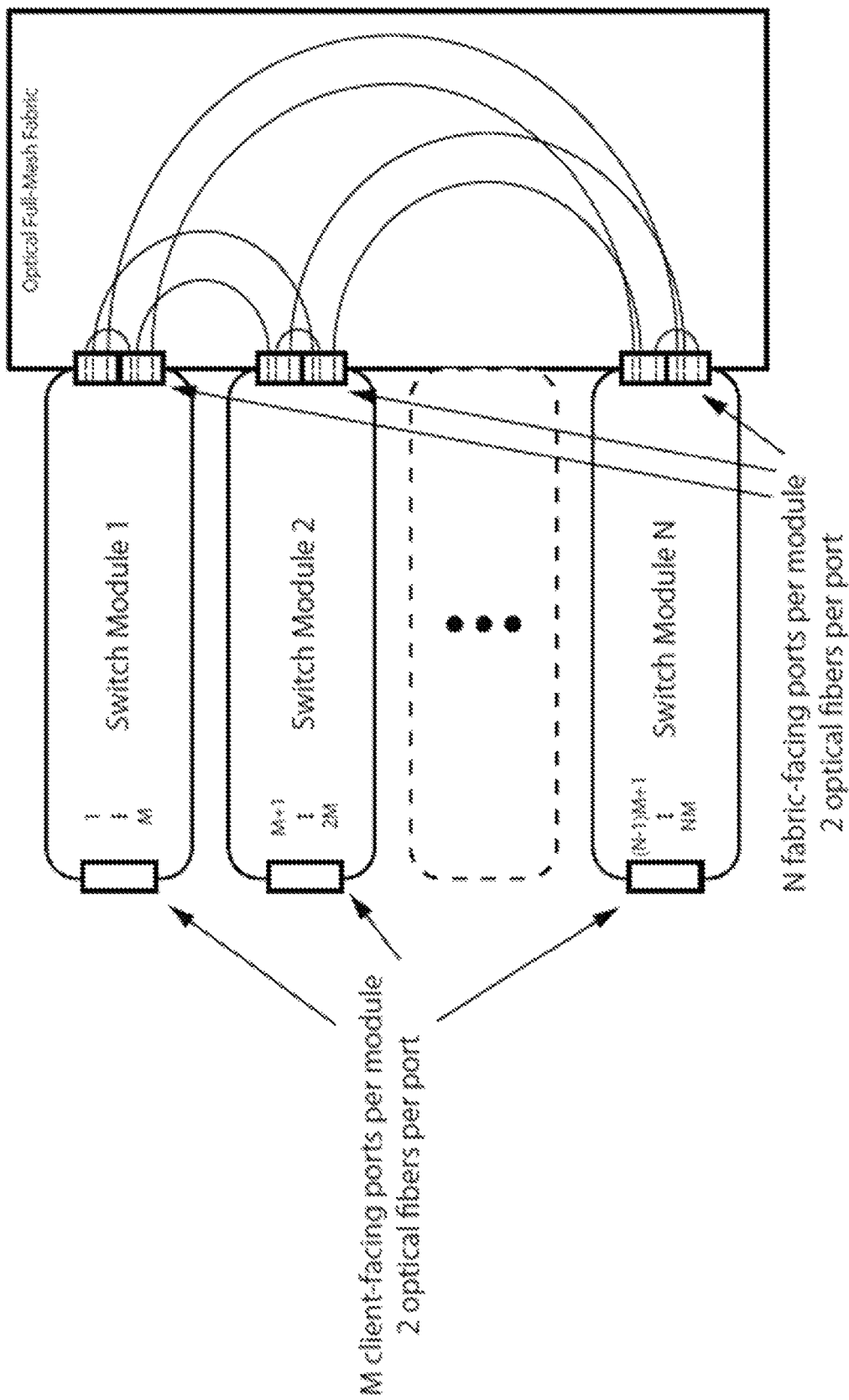
FIG. 1 shows an optoelectronic switch comprising an array of up to N switch modules and a common optical full-mesh fabric (optical full-mesh interconnect)

FIG. 1 shows an optoelectronic switch organized as an array of up to N switch modules and a common optical full-mesh fabric (optical full-mesh interconnect (C5)).

Each switch module has M client facing input ports and M client facing output ports which could take the form of M bidirectional client-facing ports with two fibers per port. In addition, each switch module has N bidirectional fabric-facing ports with two fibers per port. The optical full-mesh fabric contains N times N fibers and connects each module to each other module with two fibers, one fiber for each direction of communication. Switch modules can either be integrated with the optical full-mesh fabric or separated with connectors to allow for incremental deployment and ease of maintenance.

The switch is capable of operating with fewer than N switch modules in place. It can therefore be scaled according to requirements.

Figure 2:
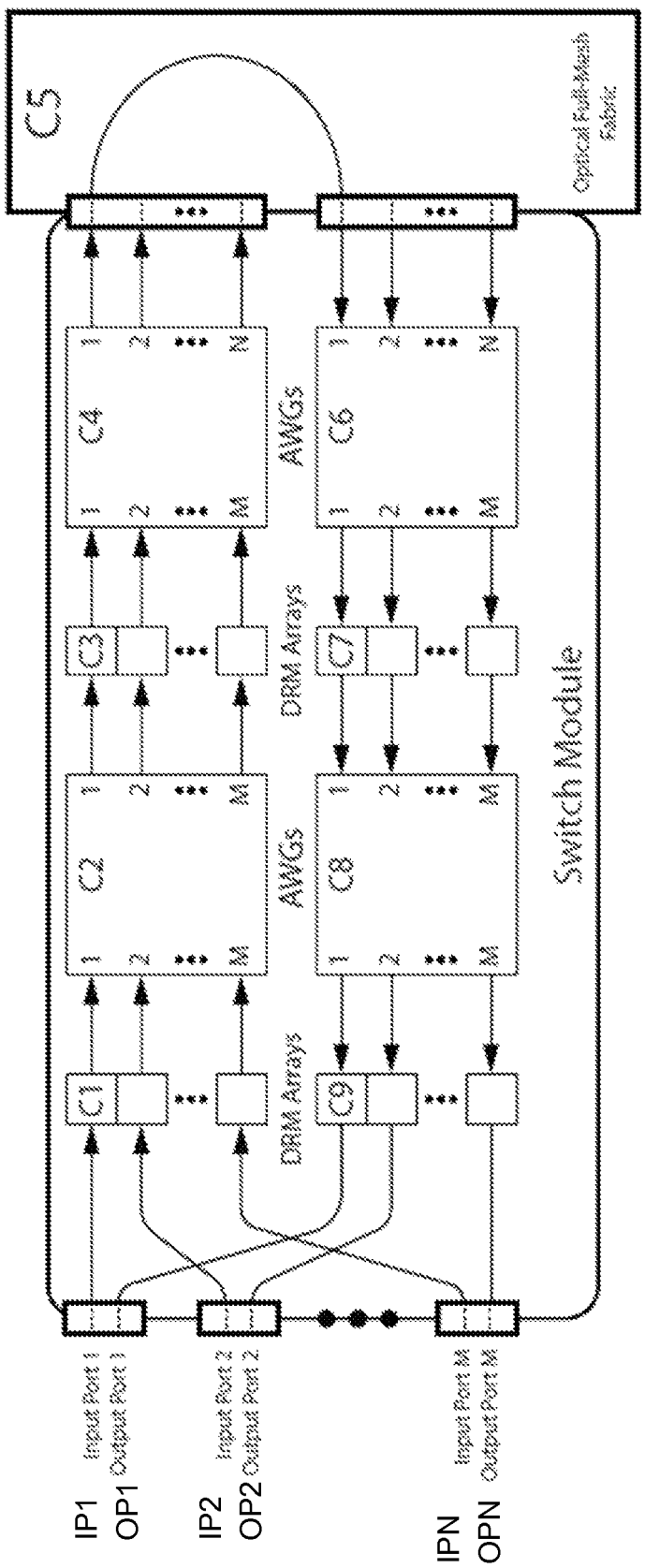
FIG. 2 shows a schematic diagram of one of the optoelectronic switch modules of FIG. 1, the optoelectronic switch module having a folded configuration.
Figure 3:
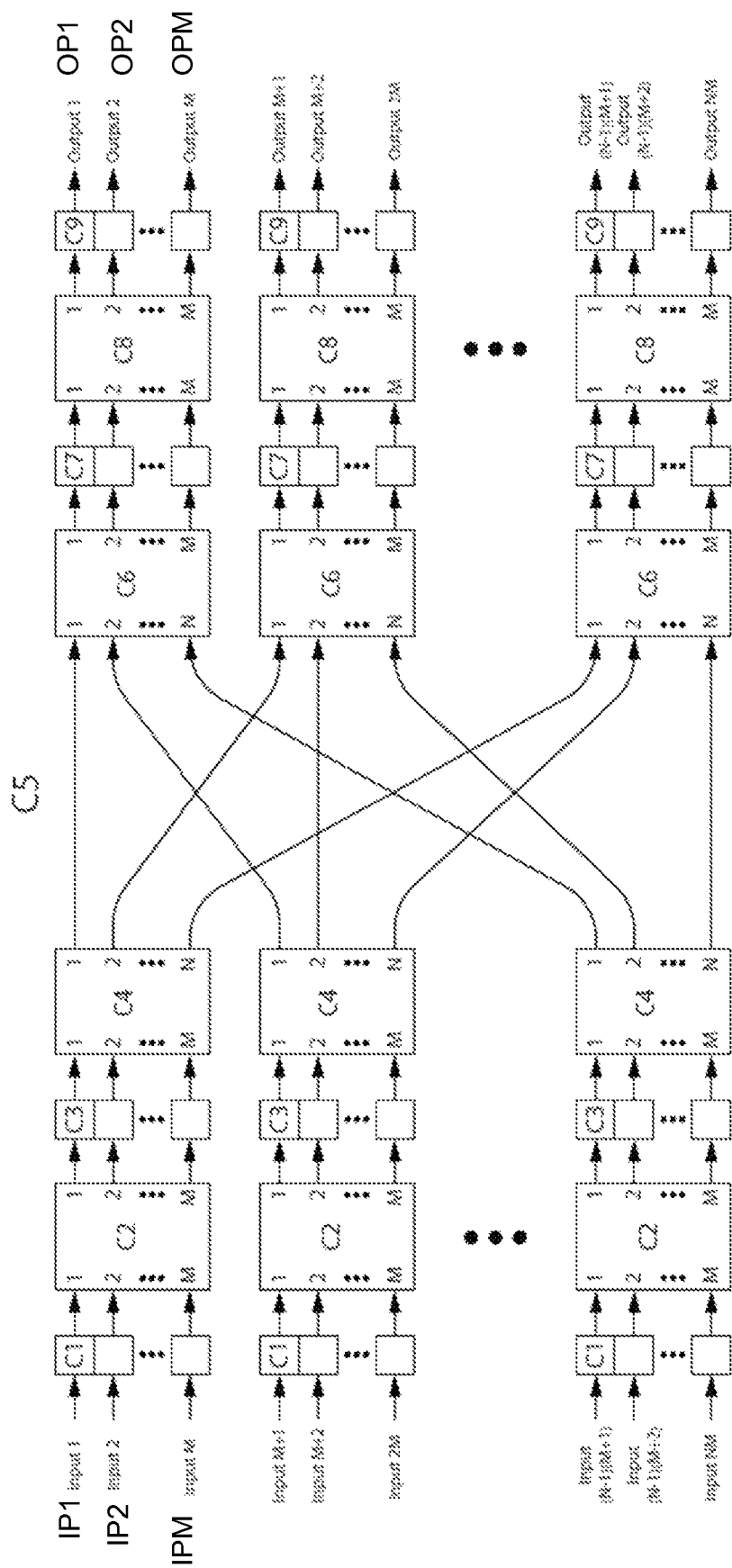
FIG. 3 shows a schematic diagram of an alternative optoelectronic switch module, the optoelectronic switch module having a flat configuration.

FIGS. 2 and 3 show constructions of an optoelectronic switch module from FIG. 1. The configuration of FIG. 3 differs from that of FIG. 2 only in that FIG. 2 has a folded configuration, and FIG. 3 has a flat configuration. The M client-facing input ports are connected to M optical fibers, which connect to the inputs of C1, an array of M DRMs. The DRMs regenerate the signals and convert the wavelengths such that each output of each DRM in the array is carried on one of M wavelengths, not necessarily unique. The M outputs of C1 connect to the M inputs of C2, an M×M AWG, with M optical fibers. The choice of wavelength at C1 determines the output port of C2. The purpose of C1 and C2 collectively is to rearrange the signals received by the switch module onto the set of output fibers of C2 in preparation for the later stages of DRMs and AWGs.

The outputs of C2 connect to the inputs of C3, an array of DRMs, using M optical fibers. Like C1, the DRMs regenerate the signals and convert the wavelengths such that each output of each DRM in the array is carried on one of N wavelengths, not necessarily unique. The M outputs of C3 connect to the M inputs of C4, an M×N AWG, using M optical fibers. The choice of wavelength at C3 determines the output port of C4. The purpose of C3 and C4 collectively is to rearrange and multiplex signals to specific output fibers of C4, where specific fibers determine the destination switch module.

The outputs of C4 connect to the inputs of C5, a common optical full-mesh fabric, using N optical fibers. Each switch module connects to every switch module, including itself, using a single optical fiber per connection, for a total of N×N optical fibers in C5. Whereas C2 was used only for wavelength routing, C4 is used for both wavelength routing and wavelength division multiplexing (WDM). Up to M switch inputs can connect to another switch module by using M different wavelengths, all carried over the same single optical fiber in C5. C5 can be integrated with the switch modules, or separated with connectors to allow for ease of maintenance and incremental deployment.

The N outputs of C5 connect to the N inputs of C6, an N×M AWG, using N optical fibers. The M outputs of C6 connect to the M inputs of C7, an array of M DRMs, using M optical fibers. Like C1, the DRMs regenerate the signals and convert the wavelengths such that each output of each DRM in the array is carried on one of M wavelengths, not necessarily unique. The M outputs of C7 connect to the M inputs of C8, an M×M AWG, using M optical fibers. The choice of wavelength at C7 determines the output port of C8. The purpose of C6 is to demultiplex and route the signals received from C5. The purpose of C7 and C8 collectively is to rearrange signals from the M output fibers of C6 to arbitrary output fibers of C8.

The M outputs of C8 connect directly to the M client-facing output ports using M optical fibers. Optionally, as shown in FIG. 2, the M outputs of C8 connect to C9, an array of M DRMs, using M optical fibers. The M outputs of C9 connect to the M client-facing output ports using M optical fibers. The purpose of C9 is to convert the wavelength and protocol used for internal routing to a wavelength and protocol compatible with the 3rd-party equipment connected to the switch module output ports.

The choice of M and N is unconstrained in this architecture, although could be constrained by other factors such as the construction of the AWGs and DRMs. In particular, we note that the embodiments described herein all depict single connections between a given switch module and each other module (i.e. the number of possible outputs of the pre-mesh AWG (C4) corresponds directly to the total number of switch modules as in FIG. 2). It is envisaged that each single connection could be replaced by parallel connections.

Each DRM in the switch module has a 3rd port, not shown in FIG. 2, for control. This control port, when connected to the appropriate electronic controller, allows the optoelectronic switch to act as a circuit switch, burst switch, packet switch, or cell switch. The differences in these four types of switches depend on how data is buffered and transmitted, and on the timescales used for establishing and breaking circuits (paths) in the switch. A circuit is established along the path of C1 through C4 on a source switch module, C5, and C6 through C8 (or optionally C9) on a destination switch module. Note that the source and destination switch modules may be the same module.

A circuit switch establishes a long-lived circuit. Data travels over this long-lived circuit without further processing. A burst switch buffers packets in a DRM, establishes a short-lived circuit, and then transmits all packets destined for a specific switch output port in a single burst. A packet switch buffers a single packet in a DRM, establishes a short-lived circuit, and then transmits a single packet destined for a specific switch output port. A cell switch buffers a single packet in a DRM, establishes a short-lived circuit, divides the packet into smaller cells, and then transmits a single cell destined for a specific switch output port. A later-stage DRM then reassembles the cells belonging to a single packet.

The AWGs in C2, C4, C6, and C8, may be equivalent assemblies of smaller AWGs providing the same function as a single larger AWG, as long as the worst-case insertion loss is less than the optical link margin between stages of DRMs.

An additional embodiment is envisaged which corresponds to either of the embodiments of FIG. 2 or FIG. 3 but with the initial array of DRMs C1 and final array of DRMs C9 removed. The purpose of C1 is to accept an input signal, in this case an optical input signal, with any format, and convert it to an optical signal with a format compatible with transmission through the switch invention. It is possible that an external transmitter could directly transmit a compatible optical signal and then C1 would not be needed. The purpose of C9 is to accept an internal optical signal with the format specific for transmission through the switch, and convert it into a format compatible with the 3rd-party receiver. It is possible that the receiver could directly use the internal optical signal.

An additional embodiment is envisaged which corresponds to either of the embodiments of FIG. 2 or FIG. 3 wherein the initial array of DRMs C1 includes additional functionality for the switch. For example, the DRMs of C1 may be configured to include buffer modules which carry out electronic buffering. This would enable the switch invention to act as a packet switch.

For any of the embodiments described herein, it is envisaged that the optoelectronic switch may include a central control component that is configured to control switching of each and every optical signal by tuning each of the wavelengths of all of the tunable laser inputs present in the system (i.e. the tunable lasers that provide the unmodulated tunable inputs for each of C1, C3, C7 and C9).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An optoelectronic switch comprising:
   N switch modules, where N is an integer; and
   an optical full-mesh interconnect;
   each switch module comprising:
      M client facing input ports, and M output facing ports, M being an integer which is either equal to or not equal to N;
      a pre-mesh AWG, the pre-mesh AWG having M inputs and N outputs, each of the N outputs connected to a respective input on the optical full-mesh interconnect;
      a post-mesh AWG, the post-mesh AWG having N inputs and M outputs, each of the N inputs connected to a respective output of the optical full-mesh interconnect and each of the M outputs for communicating a signal to one or more of the M outputs of the switch module; and
      a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG.

2. The optoelectronic switch of claim 1, further comprising a second array of Detector Remodulators (DRMs) located after the post-mesh AWG, each DRM of the second array configured to regenerate and/or convert the wavelength of a signal from a respective output port of the post-mesh AWG for communication to an output port of the switch module.

3. The optoelectronic switch of claim 2, further comprising a rearrangement AWG located after the second array of DRMs, the rearrangement AWG having M input ports and M output ports, each of the M input ports connected to an output of a respective DRM of the second array of DRMs; and each output port of the rearrangement AWG connected to an output of the switch module.

4. The optoelectronic switch of claim 3, further comprising a final array of DRMs after the rearrangement AWG such that the connection between each of the output ports of the rearrangement AWG and an output port of the switch module is via one of the DRMs of the final array.

5. The optoelectronic switch of claim 1, further comprising a rearrangement AWG located before the first array of DRMs, the rearrangement AWG having M input ports and M output ports, each of the M output ports connected to an input of a respective DRM of the first array of DRMs; and each input port of the rearrangement AWG connected to an input of the switch module.

6. The optoelectronic switch of claim 5, further comprising an array of rearrangement DRMs located before the rearrangement AWG, each DRM of the array of rearrangement DRMs configured to receive a signal from an input of the switch module and to regenerate and/or change the wavelength of the received signal to produce a DRM output, the DRM output forming an input at a respective port of the rearrangement AWG.

7. The optoelectronic switch of claim 1, wherein N>M.

8. The optoelectronic switch of claim 1, wherein N<M.

9. The optoelectronic switch of claim 1, wherein N=M.

10. The optoelectronic switch of claim 1, wherein the optical full-mesh interconnect is an optical backplane.

11. The optoelectronic switch of claim 1 configured to act as a circuit switch.

12. The optoelectronic switch of claim 1 configured to act as a burst switch.

13. The optoelectronic switch of claim 1 configured to act as a packet switch.

14. The optoelectronic switch of claim 1 configured to act as a cell switch.

15. The optoelectronic switch of claim 1, wherein the optical full-mesh interconnect has a folded configuration and each of the switch modules has a folded configuration, and wherein for each switch module:
the pre-mesh AWG is located before the fold; and
the post-mesh AWG located after the fold.

16. The optoelectronic switch of claim 15, wherein the input and output ports of each switch module are all arranged on a single external panel.

17. The optoelectronic switch of claim 1; wherein the optoelectronic switch is constructed from silicon photonics.

18. An optoelectronic switch module for use with an optical full-mesh interconnect, the optoelectronic switch module comprising:
M client facing input ports, and M output facing ports, where M is an integer;
a pre-mesh AWG, the pre-mesh AWG having M inputs and N outputs where N is an integer which is either equal to or not equal to M, each of the N outputs connected to a respective input on the optical full-mesh interconnect;
a post-mesh AWG, the post-mesh AWG having N inputs and M outputs, each of the N inputs connected to a respective output of the optical full-mesh interconnect and each of the M outputs for communicating a signal to one or more of the M outputs of the switch module; and
a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG.

19. An optoelectronic switch comprising:
N switch modules, where N is an integer; and
an optical full-mesh interconnect;
each switch module comprising:
M client facing input ports, and M output facing ports, M being an integer which is either equal to or not equal to N;
a pre-mesh AWG, the pre-mesh AWG having M inputs and N outputs, each of the N outputs connected to a respective input on the optical full-mesh interconnect;
a post-mesh AWG, the post-mesh AWG having N inputs and M outputs, each of the N inputs connected to a respective output of the optical full-mesh interconnect and each of the M outputs for communicating a signal to one or more of the M outputs of the switch module; and
a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG;
a second array of Detector Remodulators (DRMs) located after the post-mesh AWG, each DRM of the second array configured to regenerate and/or convert the wavelength of a signal from a respective output port of the post-mesh AWG for communication to an output port of the switch module;
a first rearrangement AWG located before the first array of DRMs, the first rearrangement AWG having M input ports and M output ports, each of the M output ports connected to an input of a respective DRM of the first array of DRMs; and each input port of the first rearrangement AWG connected to an input of the switch module; and
a second rearrangement AWG located after the second array of DRMs, the second rearrangement AWG having M input ports and M output ports, each of the M input ports connected to an output of a respective DRM of the second array of DRMs; and each output port of the second rearrangement AWG connected to an output of the switch module.

20. An optoelectronic switch comprising:
N switch modules, where N is an integer; and
an optical full-mesh interconnect;
each switch module comprising:
M client facing input ports, and M output facing ports, M being an integer which is either equal to or not equal to N;
a pre-mesh AWG, the pre-mesh AWG having M inputs and N outputs, each of the N outputs connected to a respective input on the optical full-mesh interconnect;
a post-mesh AWG, the post-mesh AWG having N inputs and M outputs, each of the N inputs connected to a respective output of the optical full-mesh interconnect and each of the M outputs for communicating a signal to one or more of the M outputs of the switch module; and
a first array of Detector Remodulators (DRMs) located before the pre-mesh AWG, each DRM of the first array configured to receive a signal from an input of the switch module and to regenerate and/or change the wavelength of the received signal to produce a DRM output, the DRM output forming an input at a respective port of the pre-mesh AWG;
a second array of Detector Remodulators (DRMs) located after the post-mesh AWG, each DRM of the second array configured to regenerate and/or convert the wavelength of a signal from a respective output port of the post-mesh AWG for communication to an output port of the switch module;
a first rearrangement AWG located before the first array of DRMs, the first rearrangement AWG having M input ports and M output ports, each of the M output ports connected to an input of a respective DRM of the first array of DRMs; and each input port of the first rearrangement AWG connected to an input of the switch module;
a second rearrangement AWG located after the second array of DRMs, the second rearrangement AWG having M input ports and M output ports, each of the M input ports connected to an output of a respective DRM of the second array of DRMs; and each output port of the second rearrangement AWG connected to an output of the switch module;
an additional array of DRMs located before the first rearrangement AWG, each DRM of the additional array configured to receive a signal from an input of the switch module and to regenerate and/or change the wavelength of the received signal to produce a DRM output, the DRM output forming an input at a respective port of the first rearrangement AWG; and
a final array of DRMs located after the second rearrangement AWG such that the connection between each of the output ports of the second rearrangement AWG and an output port of the switch module is via one of the DRMs of the final array.

* * * * *